United States Patent Office 3,530,610
Patented Sept. 29, 1970

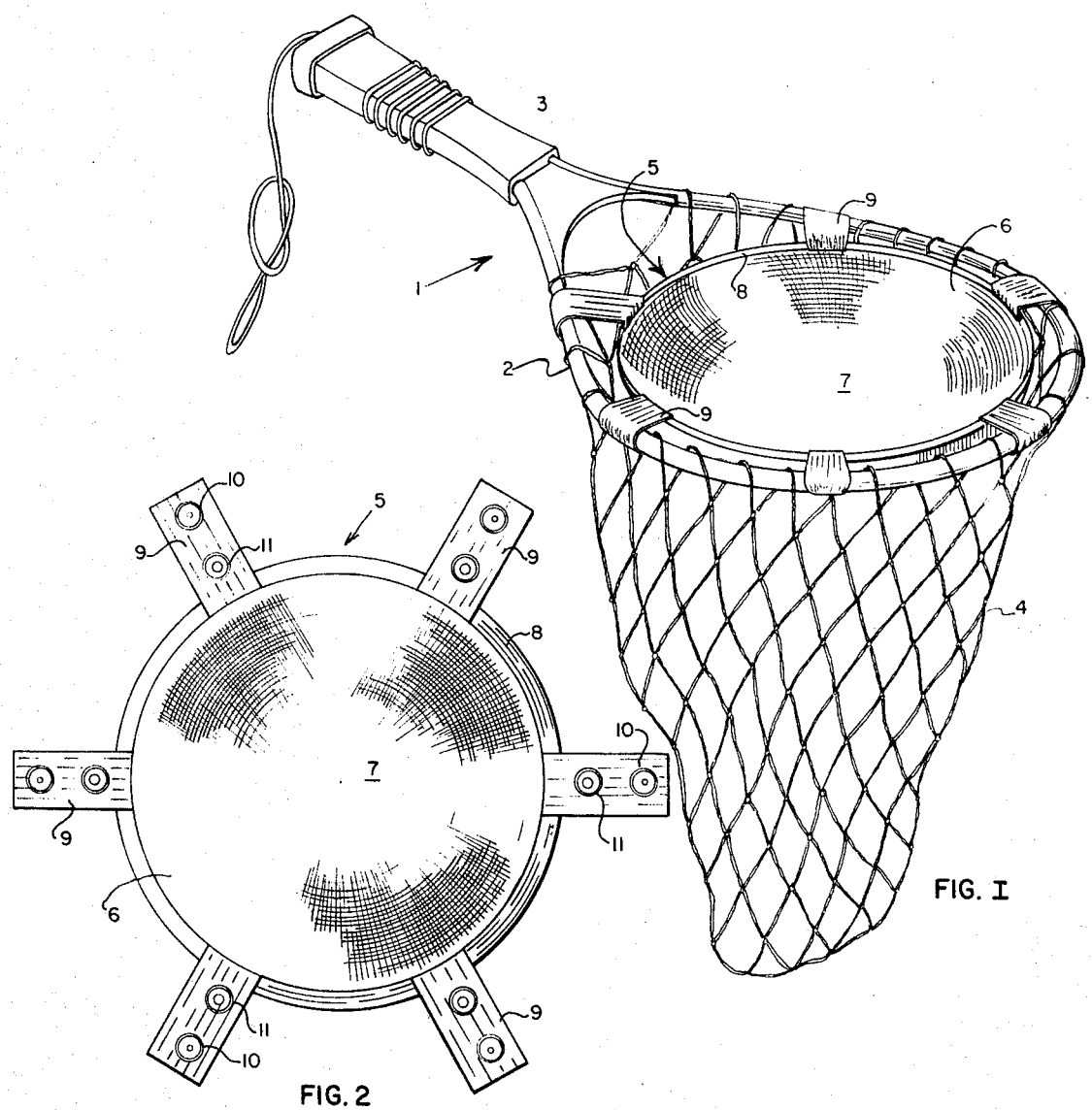
FIG. 1
FIG. 2
FIG. 3
INVENTOR.
FRED C. BREMER
BY
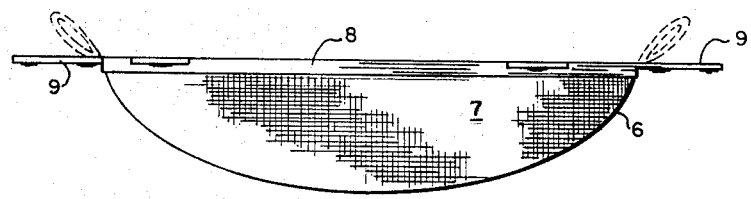

3,530,610
FISHERMAN'S WATER ANALYZING APPARATUS
Fred C. Bremer, 4740 Rica Road, Saginaw, Mich. 48603
Filed Nov. 19, 1968, Ser. No. 776,916
Int. Cl. A01k 77/00
U.S. Cl. 43—11                                                      6 Claims

ABSTRACT OF THE DISCLOSURE

A fisherman's landing net having a loop support to which is secured an open mouth net of relatively coarse mesh, the open mount of the net being closed by netting of relatively fine mesh, whereby dipping the landing net into a body of water will enable the contents of the water to be trapped by the relatively fine mesh netting material for analysis. The fine mesh netting material is removable from the landing net to enable the latter to function in its customary manner.

---

The invention disclosed herein relates to apparatus adapted for removable connection to a fly fisherman's landing net for the purpose of enabling the fisherman to collect and examine insects populating the waters being fished, thereby making it possible for the fisherman to select artificial flies similar in size and appearance to the insects contained in the water.

Fresh water game fish feed on insects of various kinds and in various stages of development. The insect diet of some varieties of fish is greater than that of other varieties of fish, but those which can be caught by artificial flies consume large quantities of insects. For example, the diet of trout of all kinds, crappies, bass and bluegills is composed in large part of insects. Not all game fish eat the same kinds of insects, however, nor is the availability of a particular species of insect constant in all parts of the country, or in different parts of the same state, or even in the same area throughout the fishing season. Fish which are accustomed to eating one or two varieties of insects may refuse to eat insects unlike those to which they are accustomed. It is of extreme importance to the fly fisherman, therefore, that he know the kinds of insects which populate the waters he intends to fish. Accordingly, it is essential that the serious fisherman be equipped with means for analyzing the insect content of the water.

The most common insects furnishing food for game fish are various kinds of flies, such as May flies, caddis flies, stone flies, alder flies, black flies, midges, and the like, although there is a large variety of other insects which also are eaten by fish. For example, ants, grasshoppers, crickets, waterbugs, beetles, and fresh water shrimp frequently constitute a substantial portion of a fish's diet. Not all of the fish in a particular body of water eat insects in the same stage of development, however. For example, brook, brown and rainbow trout feed mainly on underwater nymphs, larvae, and crustaceans and, to a lesser degree, on the insects that have fallen into the water by accident. Brown trout are more inclined to feed on flies floating on the surface of the water than are brook and rainbow trout, the latter being inclined to feed slightly more on underwater organisms than brown trout. Other fish, such as crappies, bluegills, sunfish and small and large mouth bass feed largely on insects in the nymph or larvae form.

At various stages of their development from an egg to maturity, insects will occupy different levels in a stream. For example, most female May flies deposit their eggs on the surface of the water and, shortly thereafter, die and usually lie on the surface of the water with wings outstretched. The deposited eggs hatch into wingless creatures called nymphs which hide in the gravel, vegetation or mud of the lake or stream bottom. As the nymph grows it molts many times and the wing cases at the forward part of its body develop. The wing cases hold the wings as they develop and, when the wing cases turn black, the nymph is ready to change into an adult winged insect. As the nymph arrives at the time it is to change into a winged fly, it becomes agitated and swims nervously, darting to the surface of the water and back to the bottom. On one of these trips to the surface it will take in some air at which point it will float on or near the surface of the water. Its nymphal skin splits down the back and the winged fly pulls itself out. The fly usually floats on the nymphal skin for a few seconds until its wings are dry. It then flies from the water to a tree, bush, or rock on shore, and it may flop around quite a bit before getting off the water at all. At this stage of development the fly is known as sub-imago or dun. After the sub-imago reaches the shore, it rests, shedding its skin again and changing into an imago or spinner. This is the final stage of the May fly.

At any stage of development of the May fly it may appeal to a particular variety of fish. Since the insect may occupy any position in the water between the bottom and the surface, as well as slightly above the surface, it is important to the fisherman that he be able to obtain specimens of the water's content at all levels, including a level somewhat above that the water's surface. It is only by examining the insects that the fisherman can select an artificial fly which is similar to the natural insects in the water and upon which the fish feed.

The need for some means to enable the analysis of a body of water to be completed has been recognized heretofore, and various proposals have been made. For example, it has been proposed that a fisherman equip himself with a litter-like device comprising an elongated length of fine mesh wire or screen secured to a pair of parallel sticks, thereby enabling the trapping of insects in the water. It also has been proposed to provide a fisherman with an extremely fine mesh net, similar to the conventional dip net and which would enable insects to be dipped directly from the water. These and other proposals have not enjoyed much popularity for several reasons, notable among which is the difficulty encountered by the fisherman in maintaining possession of the apparatus while fishing and without encumbering the fly casting operations. This problem readily can be appreciated when it is realized that the typical fly fisherman wears waders or boots, carries a creel, a landing net, a large supply of flies, a fishing rod and, in addition, is standing in water which may be flowing quite rapidly. If he also must carry an additional net or litter-like device for analyzing the contents of the water, the fisherman finds himself hard pressed to cast properly, land a fish he catches, and in many instances, maintain his balance.

An object of this invention is to provide a fisherman's device for analyzing the content of a body of water and which overcomes the disadvantages of known constructions for similar purposes.

Another object of the invention is to provide analyzing apparatus of the character described which is small in size, collapsible and capable of removable attachment to the landing net with which the fisherman conventionally is equipped.

A further object of the invention is to provide analyzing apparatus of the kind referred to which is quickly and easily capable of attachment to and detachment from a landing net or, alternatingly, stowable on the landing net without interfering with the manual use of the latter.

Other objects and advantages of the invention will be pointed out specifically or will become apparent from the following description when it is considered in conjunction with the appended claims and the accompanying drawing, in which:

FIG. 1 is a perspective view of a typical fisherman's landing net equipped with a water analyzing device constructed in accordance with the invention;

FIG. 2 is a top plan view of the analyzing device; and

FIG. 3 is a side elevational view of the analyzing device.

An analyzing device constructed in accordance with the invention is adapted for use in conjunction with a typical fisherman's landing net 1 comprising a loop 2 formed of wood or tubular material and having its ends anchored to a handle 3. Secured to the loop 2 is a net 4 composed of natural or synthetic fibers woven into a relatively coarse mesh netting having an open mouth at the loop 2. The size of the mesh is sufficiently small to assure retention of a fish and sufficiently large to assure immediate passage of water through the netting.

A device for attachment to the landing net 1 for purposes of analyzing the content of a body of water is designated generally by the reference character 5 and comprises a body 6 formed of synthetic or natural fibers woven to form netting material 7 of very fine mesh as compared to the mesh of the netting 4. The body 6 is shaped to conform generally to the shape of the net loop 2 and at its marginal edge is provided with a binding 8 having a diameter less than that of the body 6 to which the marginal edge of the body is stitched or otherwise fixed. Since the diameter of the binding 8 is less than that of the body 6, the netting 7 will sag or present an upwardly concave appearance. The diameter of the binding 8 preferably corresponds to or is slightly less than the diameter of the net loop 2 so as to enable the device 6 to be accommodated within the loop 2 and substantially close the open mouth of the net 4.

Means is provided for removably securing the analyzing device 5 to the net 1 and comprises a plurality of radially extending, flexible tabs 9, each of which is of such length as to wrap around and embrace the loop 2. At the free end of each tab is one-half 10 of a separable fastener and between the ends of each tab is a second half 11 of the separable fastener. The spacing between the fastener halves 10 and 11 is sufficient to enable them to meet after the tab has been wrapped around the loop 2.

To condition the apparatus for use, the device 5 may be associated with the net 1 at the open mouth thereof and the tabs 9 wrapped around the loop 2, the free ends of the tabs passing between adjacent strands of the net 4 so as to permit the fastener halves 10 and 11 to be joined. The area of the body 6 is greater than that of the mouth of the net 1, so when the body 6 is in place the netting 7 sags and forms an inwardly dished, filter-like member at the open mouth of the netting 4. When the apparatus is dipped into the water, or moved through the air like a butterfly net, any material which is too large to pass through the mesh of the netting 7 will be trapped on the upper surface thereof so as to enable it readily to be examined by the fisherman. By observing the kind of insect life with which the water is populated, the fisherman may select an artificial fly simulating a natural specie of insect.

The device can be used to dredge the bottom of the body of water, as well as to collect insects at any depth. It thus is possible for a fisherman to make a complete analysis of the water's contents without dipping his hands in the water.

One of the advantages of the disclosed apparatus is that the mesh of the netting 7 may be such as readily to pass water, while being sufficiently fine to retain small nymphs and larvae. Moreover, water which passes through the netting 7 is not collected by the netting 4, but is discharged immediately to the stream or other body of water under analysis.

When the insect content of the water is known, the device 5 may be removed from the net 1 by separating the fastener halves. The device then may be folded and placed in a waterproof pouch for carrying in the pocket of the fisherman without providing any encumberance at all to his movements. Alternatively, some of the tabs may be disconnected from the loop 2, permitting the device 5 to be draped alongside the netting 4, whereupon one or more of the tabs which were removed from the loop to be secured to the netting 4 to stow the device 5 on the landing net itself.

The disclosed embodiment is representative of the presently preferred form of the invention, but is intended to be illustrative rather than definitive thereof. The invention is defined in the claims.

I claim:

1. Apparatus for converting a fisherman's open mouth net to a device for analyzing the content of a body of water, said net having a support to which is secured netting of predetermined mesh, said apparatus comprising netting material having a mesh less than that of the netting of said net; and means for securing said netting material across the mouth of said net, said support comprising a loop and said securing means comprising a plurality of tabs secured at one end to said netting material and being of such length as to wrap around and embrace said loop.

2. Apparatus as set forth in claim 1 wherein each of said tabs has a first fastener half between its ends and a second fastener half adjacent its other end, said fastener halves being separably secured to one another.

3. In combination, a fisherman's open mouth net having a support to which is secured netting of predetermined mesh; netting material having a mesh smaller than that of said netting and having an area at least as great as that of the mouth of said net; and means detachably securing said netting to said support and substantially closing the open mouth of said net.

4. The construction set forth in claim 3 wherein the area of said netting material is greater than the area of the mouth of said net whereby said netting material may sag.

5. The construction set forth in claim 3 wherein said support comprises a loop and wherein said securing means embraces said loop.

6. The construction set forth in claim 3 wherein said netting material has a peripheral binding having an area corresponding substantially to the area of said support and wherein said securing means extends between said binding and said support.

References Cited

UNITED STATES PATENTS 2,604,715  7/1952  Brown _____ 43—11

FOREIGN PATENTS 1,459,253  10/1966  France.

WARNER H. CAMP, Primary Examiner